No. 890,699. PATENTED JUNE 16, 1908.
R. H. PARKER.
METHOD OF OPERATING INDUCTION MOTORS.
APPLICATION FILED DEC. 4, 1905.
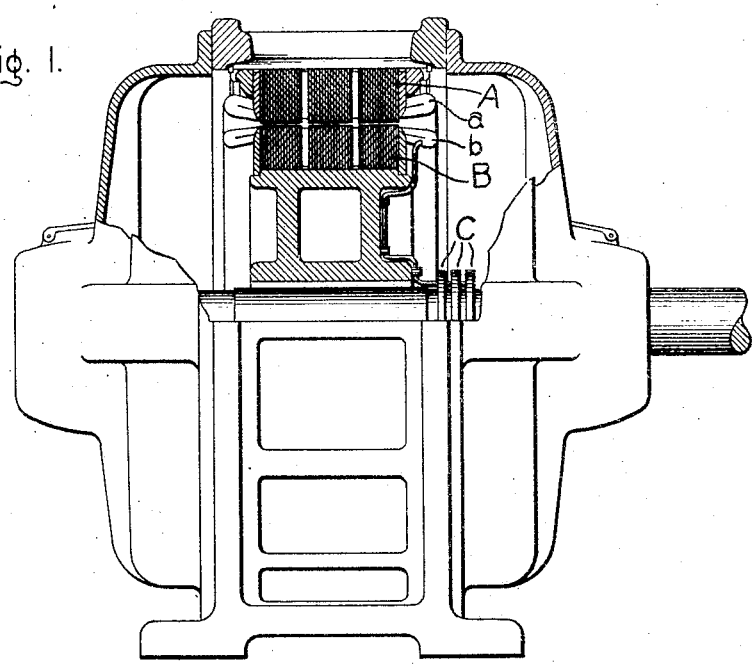
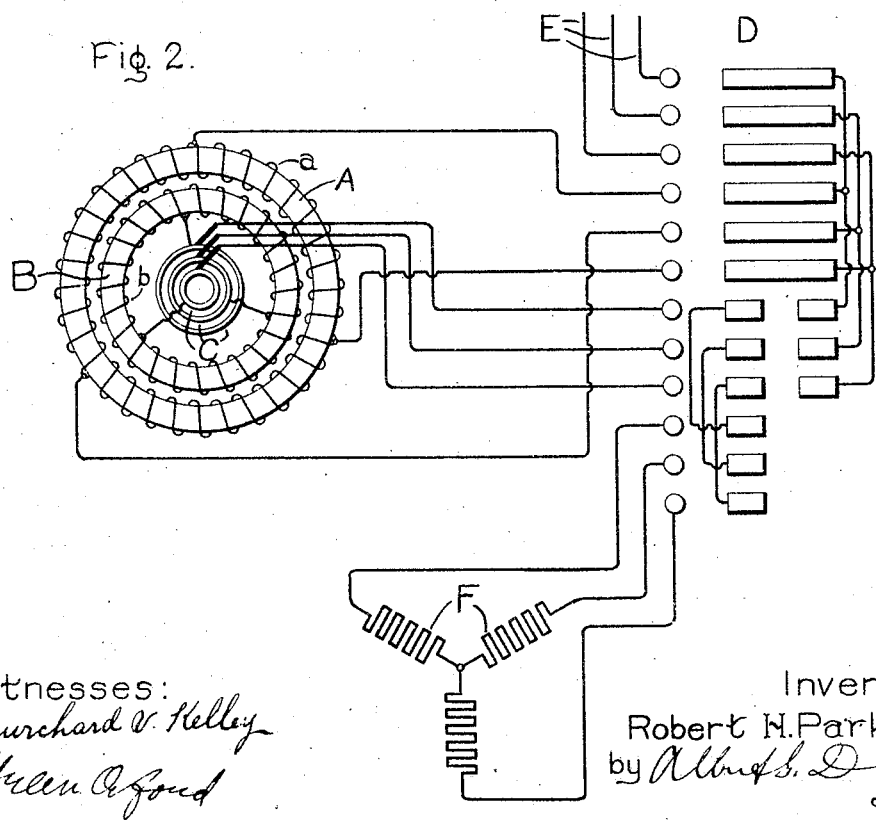
Witnesses:
Burchard V. Kelley
Helen A. Gould
Inventor:
Robert H. Parker,
by Albert S. Davis
Att'y.

UNITED STATES PATENT OFFICE.

ROBERT H. PARKER, OF SCHENECTADY, NEW YORK, ASSIGNOR TO GENERAL ELECTRIC COMPANY, A CORPORATION OF NEW YORK.

METHOD OF OPERATING INDUCTION-MOTORS.

No. 890,699.

Specification of Letters Patent.

Patented June 16, 1908.

Application filed December 4, 1905. Serial No. 290,143.

*To all whom it may concern:*

Be it known that I, ROBERT H. PARKER, a citizen of the United States, residing at Schenectady, county of Schenectady, State of New York, have invented certain new and useful Improvements in Methods of Operating Induction-Motors, of which the following is a specification.

My invention relates to induction motors of the type in which both stator and rotor are coil-wound, and consists in a novel method of operating such motors. It has been proposed heretofore to operate motors of this type at twice synchronous speed by bringing the rotor up to that speed and connecting both windings to a source of polyphase current with one phase of one winding relatively reversed. A motor thus connected has heretofore always been considered as essentially a synchronous,—or more strictly speaking, a double-synchronous machine. I have discovered, however, that a machine of this type, with the connections above mentioned, may be operated asynchronously at substantially the same speed as though one winding were short-circuited in the usual manner, and that a machine thus operated possesses certain material advantages over the ordinary induction motor. A motor thus connected, and operating asynchronously at a speed somewhat below synchronism like an ordinary induction motor, may be considered as in reality two motors in one. The polyphase currents supplied to the stator produce a rotary field which revolves synchronously with respect to the stator, and induces in the rotor, which revolves at a certain slip below synchronism, low frequency alternating-currents, as in the usual induction motor. If both windings are connected in parallel to the source, the stator winding serves to complete the circuit of the rotor for the low frequency currents, and since the induced rotor currents are of very low frequency, the impedance offered by the stator winding to these currents is small and the rotor acts with respect to these currents as though it were directly short-circuited. In other words, the rotary field produced by the currents supplied to the stator produce an induction motor action in the usual way. A second rotary field, moreover, exists in the motor, produced by the currents supplied to the rotor. This field revolves at a synchronous speed with respect to the rotor, and in a direction opposite to the rotation of the rotor and of the stator rotary field. Since the rotor is moving at a speed somewhat below synchronism, this second rotary field revolves in space at a speed corresponding to the slip of the rotor, and in a direction in space, or in other words, with respect to the stator, opposite to the direction of rotation of the field produced by the currents supplied to the stator. This second rotary field consequently induces in the stator winding low frequency secondary currents which find a closed path through the rotor winding.

If stator and rotor are connected directly in parallel to the same source, the low frequency currents induced in both windings are in phase with respect to the closed local circuit formed by the two windings and consequently form a single resultant low frequency current which flows through the two windings in series. A second induction motor action is thus produced by this second rotary field. The efficiency of a motor operated in this manner is greater than that of an ordinary induction motor, and also its maximum output is greater. The reason for this is, first, that the magnetizing currents are divided equally between the two windings, and secondly, the ohmic loss in each winding is not the sum of the ohmic loss which would be produced by each current singly, but instead, is only the square-root of the sum of their squares. This follows from the well known law that when a conductor is traversed by an alternating-current and a direct current, or by two alternating currents of different frequency, the ohmic loss is not the sum of the losses which would be produced by each of the currents singly; but is equal to the square-root of the sum of their squares. Consequently, for a given load on the motor the energy wasted in heat due to ohmic drop is less than in an induction motor operated in the usual manner,—or stated in another way, for the same amount of heating, a machine operated in accordance with my invention will carry a greater load than a machine operated in the usual manner with current supplied to only one winding and the other short-circuited.

At starting an induction motor it is desirable, from the stand-point both of efficiency and torque, that the secondary winding should contain a high resistance.

My invention, therefore, further consists in starting an induction motor with only one winding connected to the source of current, and the other short-circuited through resistance in the usual manner; and then when the motor is up to speed, connecting the second winding to the source in parallel with the first and with the connections of one phase relatively reversed.

My invention will best be understood by reference to the accompanying drawings, in which Figure 1 shows an induction motor adapted for operation in accordance with my invention; and Fig. 2 shows diagrammatically the circuit-connections of a motor and controlling switch adapted for use in practicing my invention.

In the drawings, A represents the stator of an induction motor provided with the usual arrangement of distributed coils $a$.

B represents the rotor, which is constructed in the usual manner and provided with distributed coils $b$. The rotor is also provided with collector rings C, connected to fixed points on the rotor winding, by means of which current may be supplied to the rotor.

D represents a controlling switch adapted in one position to connect the stator winding to a source of three-phase current indicated by the line-wires E, and to short-circuit the rotor winding through a resistance F, and in its other position to connect both stator and rotor through the line-wires E. It will be observed that when the stator and rotor are both connected to the source, the terminal connections of one phase are reversed relatively to the two windings, so that if the rotary field produced by the current supplied to the stator is considered as rotating in a counter-clockwise direction, the currents supplied to the rotor winding will produce a rotary field which revolves in a clockwise direction with respect to the rotor winding. The stator field revolves synchronously, as in the ordinary induction motor, and the rotor winding revolves in the same direction at a speed somewhat below synchronism. The rotor field, which revolves in the opposite direction and at a synchronous speed with respect to the rotor winding, revolves in space, or with respect to the stator winding, in a direction opposite to that of the stator field, and at a speed corresponding to the slip of the rotor.

With the connection shown in Fig. 2, the motor is started exactly like the usual induction motor, with the resistance in the secondary circuit, and when up to speed operates with two rotary fields revolving in opposite directions in the manner heretofore described, and with the advantages which have been heretofore pointed out.

Although I have illustrated a motor supplied with polyphase current, my invention, in its broadest aspects, is not limited to a polyphase motor. A single-phase induction motor, when operating at a speed somewhat below synchronism, possesses a rotary field, and consequently, if a single-phase motor is brought up to normal speed and the rotor winding is then connected to the single-phase source, two rotary fields will be produced in the motor, rotating in opposite directions in the same manner as the fields produced by polyphase currents heretofore described. Furthermore, although I have shown the two windings connected directly in parallel to the source, this connection is not essential for operation. If the two windings were connected to different sources, as, for instance, to different transformers, the operation would be exactly the same as has been heretofore explained, except that the statement in regard to each winding serving to close the circuit of the other winding would not apply. Instead, the low frequency current induced in each winding would close itself through the source or any other circuit in parallel with that winding.

What I claim as new and desire to secure by Letters Patent of the United States, is,—

1. The method of operating asynchronously an induction motor having both rotor and stator coil-wound, which consists in producing two rotating fields in said motor, one rotating at synchronous speed with respect to the stator and the other rotating in the opposite direction at a speed with respect to the stator corresponding to the slip of the rotor below synchronous speed.

2. The method of operating asynchronously an induction motor having both rotor and stator coil-wound, which consists in supplying polyphase currents to fixed points on the windings of both members with the terminal connections of one phase of rotor and stator relatively reversed so as to produce in the motor two rotary fields rotating in space in opposite directions.

3. The method of operating asynchronously an induction motor having both rotor and stator coil-wound, which consists in connecting fixed points on both rotor and stator winding in parallel to a source of polyphase current with the terminal connections of one phase relatively reversed so as to produce in the motor two rotary fields rotating in space in opposite directions.

4. The method of operating an induction motor having both rotor and stator coil-wound, which consists in establishing suitable connections for starting and when the motor has approached synchronous speed supplying alternating-current to fixed points on both windings whereby two rotary fields are produced rotating in space in opposite directions.

5. The method of operating an induction motor having both rotor and stator coil-wound, which consists in starting the motor by supplying polyphase current to one winding and short-circuiting the other and then supplying polyphase currents to both windings with the terminals of one phase of one winding relatively reversed so as to produce in the motor two rotary fields rotating in space in opposite directions.

6. The method of operating an induction motor having both rotor and stator coil-wound, which consists in connecting one winding to a source of polyphase currents and short-circuiting the second winding through a resistance at starting, and then when the motor is up to speed connecting said second winding to said source with one phase reversed so as to produce in the motor two rotary fields rotating in space in opposite directions.

7. The method of operating an induction motor having both rotor and stator coil-wound, which consists in bringing the motor nearly up to synchronous speed and then operating the motor by supplying alternating-current to fixed points on both windings whereby two rotary fields are produced rotating in space in opposite directions.

In witness whereof, I have hereunto set my hand this 29th day of November, 1905.

ROBERT H. PARKER.

Witnesses:
BENJAMIN B. HULL,
HELEN ORFORD.